United States Patent [19]

Sanada et al.

[11] 4,112,053
[45] Sep. 5, 1978

[54] DRY METHOD FOR THE DENITRIFICATION OF EXHAUST GAS CONTAINING NITROGEN OXIDES

[75] Inventors: Hisao Sanada; Ritaro Saito; Masayuki Funabashi, all of Iwaki; Kazuyoshi Inada; Koji Seguchi, both of Tokyo, all of Japan

[73] Assignee: Kureha Kagaku Kogyo Kabushiki Kaisha, Tokyo, Japan

[21] Appl. No.: 756,628

[22] Filed: Jan. 4, 1977

[51] Int. Cl.$^2$ .............................................. B01D 53/34
[52] U.S. Cl. ............................... 423/239; 252/466 J; 252/471
[58] Field of Search ............. 423/239; 252/472, 466 J, 252/471

[56] References Cited

U.S. PATENT DOCUMENTS 3,959,440  5/1976  Mizuno et al. ...................... 423/239

FOREIGN PATENT DOCUMENTS 2,460,681  7/1975  Fed. Rep. of Germany ........... 423/239
2,411,888  9/1974  Fed. Rep. of Germany ........... 423/239
   59,086  5/1976  Japan ..................................... 423/239
   14,386  9/1974  Japan ..................................... 423/239
  109,056  7/1918  United Kingdom .................... 423/239

OTHER PUBLICATIONS

"Chemical Abstracts" vol. 75, 1971, 78912s.

Primary Examiner—G. O. Peters
Attorney, Agent, or Firm—Lane, Aitken, Dunner & Ziems

[57] ABSTRACT

From an exhaust gas containing nitrogen oxides, the nitrogen oxides can be advantageously removed by contacting the exhaust gas with ammonia in the presence of a substance derived from laterite.

3 Claims, 11 Drawing Figures

DRY METHOD FOR THE DENITRIFICATION OF EXHAUST GAS CONTAINING NITROGEN OXIDES

FIELD OF THE INVENTION

This invention relates to a method for advantageously removing nitrogen oxides (hereinafter referred to as $NO_x$) from an exhaust gas containing $NO_x$, by contacting the exhaust gas with ammonia in the presence of a substance derived from laterite.

BACKGROUND OF THE INVENTION

Generally, exhaust gases issuing from various types of combustion apparatus contain $NO_x$, occasionally in conjunction with other gaseous components such as sulfur oxides (hereinafter referred to as $SO_x$). The $NO_x$ constitutes the principal cause of the so-called photochemical smog which has posed as a serious social problem. From the standpoint of prevention of air pollution, it is necessary that such an exhaust gas should be released into the atmosphere only after it has been freed from $NO_x$.

For the removal of $NO_x$ from $NO_x$-containing exhaust gases, there have heretofore been proposed numerous methods including so-called wet absorption methods and so-called dry vapor-phase catalytic reduction methods. The dry vapor-phase catalytic reduction methods are those which use hydrocarbons like methane, carbon monoxide, hydrogen and ammonia, for example, as the reducing agent for $NO_x$. Of these catalytic reduction methods, that which involves the use of ammonia is extensively employed for the removal of $NO_x$ from industrial exhaust gases containing a major proportion of oxygen in conjunction with a minor portion of $NO_x$. This is because the reaction of ammonia with $NO_x$ proceeds practically selectively even in the presence of oxygen.

The method, which makes use of ammonia, includes contacting the $NO_x$-containing exhaust gas with ammonia in the presence of a catalyst generally at temperatures in the range of from 200° C to 400° C so as to react the $NO_x$ with ammonia, thereby converting the $NO_x$ into $N_2$. In this method, the oxide of a metal such as Mn, Cu, Cr, V, Fe, Ti or Sn is used as the catalyst. Where there is used the oxide of such a metal, however, if the exhaust gas happens to contain $SO_x$, then the metal oxide catalyst is poisoned by the $SO_x$ and consequently is prevented from advantageously manifesting its catalytic activity, with the result that the efficiency of removal of $NO_x$ is reduced. This method has also an economic disadvantage that the oxide of such a metal is generally rather expensive. Further, in the use of the metal oxide as the catalyst, it is frequently observed that traces of foreign matter contained in the oxide will bring about the so-called poisoning effect of heavily retarding or completely inhibiting the catalytic reaction. To prevent this poisoning effect, it is necessary to use a metal oxide of high purity obtained by the so-called impregnation method or precipitation method. A metal oxide of such high purity, however, is not easy to produce. In spite of such a high purity, a metal oxide is not completely free from the poisoning effect of $SO_x$.

SUMMARY OF THE INVENTION

It is, therefore, the primary object of this invention to provide a method for the removal of $NO_x$ from the $NO_x$-containing exhaust gas by advantageously effecting catalytic reduction of the $NO_x$ with ammonia which method is not adversely affected by the presence of $SO_x$.

This object and other objects of the present invention will become apparent from the following description of the invention.

Generally, the catalyst used for the denitrification of an exhaust gas is desired from the practical point of view to have the following advantages (1) through (3):

(1) The catalyst should be capable of maintaining high ratio of denitrification at low temperatures.
(2) The catalyst should be capable of being produced at a low cost.
(3) The catalyst should not create a possibility of secondary pollution (during the denitrification or during the disposal of used catalyst, for example).

We, therefore, made a study in search of a catalyst for the reduction of $NO_x$, which has all the advantages of (1) through (3) indicated above and is capable of providing the catalytic activity continuously without reference to the presence or absence of $SO_x$ in the exhaust gas. We have, consequently, arrived at a discovery that a substance obtained by suitable treatment of laterite (a naturally occurring ore) constitutes a catalyst which satisfies all these requirements.

According to this invention, there is provided a method for removing $NO_x$ from an exhaust gas containing the $NO_x$, which method includes contacting the exhaust gas with ammonia in the presence of a material obtained by baking laterite at a temperature in the range of from 200° C to 500° C, a material obtained by immersing laterite in an aqueous solution of a compound selected from the group consisting of ammonia and ammonium salts and subsequently baking the treated laterite at a temperature in the range of from 200° C to 500° C, a material obtained by contacting laterite with hydrogen or ammonia and subsequently baking the treated laterite at a temperature in the range of from 200° C to 500° C, or a material obtained by baking at a temperature in the range of from 200° C to 500° C a mixture consisting predominantly of laterite.

DETAILED DESCRIPTION OF THE INVENTION

The laterite, which is used as the raw material for the preparation of the catalyst in this invention, is considered to be a residue which is formed when ultrabasic rock such as chrysolite or serpentine abounding in iron and magnesia mineral components has undergone tropical weathering for a long time so that soluble components such as magnesia and silica have mostly been dissolved out and insoluble components such as oxy-iron hydroxide and aluminum oxide remain after the dissolution. Because of the manner of its formation, laterite contains many metal compounds in the form of a mixture. These metal compounds are individually in the form of oxides, oxyhydroxides or hydrates. On exposure to heat, laterite releases water and consequently has its structure altered. When laterite is heated at 150° C to 350° C, it is deprived of its weight by about 10 percent because of loss of water. Between 220° C to 350° C, laterite has a mild transition point. As the heating of laterite is continued beyond this transition point, the laterite's loss of weight dwindles to a very slow rate. As the temperature is rising past the neighborhood of 500° C, part of the laterite begins to undergo sintering. At temperatures above 800° C, loss of water again begins and continues until the constant weight is reached. Laterite particles ranging approximately from 0.5 $\mu$ to 10 $\mu$, which were baked at 300° C, have a surface area of about 150 $m^2/g$, whereas those having equal particle diameters and baked at 800° C have a surface area of about 40 $m^2/g$.

The catalyst in the present invention is the material (hereinafter referred to as Material A) obtained by baking laterite of the aforementioned description at a temperature of from 200° C to 500° C. When laterite is baked at the temperature, the resultant Material A has a surface area of not less than 50 $m^2/g$ if the particle diameters thereof range approximately from 0.5 $\mu$ to 10 $\mu$. This surface area of the produced Material A is preferred to be not less than 100 $m^2/g$.

Generally, a method developed for the removal of $NO_x$ from the exhaust gas by use of ammonia includes contacting the exhaust gas with ammonia usually at a temperature of from 200° C to 400° C in the presence of a catalyst, thereby causing a reaction between the $NO_x$ and ammonia and consequently converting the $NO_x$ into $N_2$ as described previously. In contrast, the method of the present invention differs from the conventional method in that it does not use conventional catalysts. The present invention, is effectively carried out by contacting the exhaust gas with ammonia in the presence of Material A at a temperature of from 200° C to 400° C, preferably in the neighborhood of 300° C. Laterite in its naturally occurring form may be used in the place of Material A. This is because the unaltered laterite is converted into Material A in the course of denitrification. Where the denitrification is carried out by using Material A, care should be taken to maintain the temperature above the level of 200° C, because at temperatures below this level by-products such as ammonium nitrite and ammonium nitrate form.

When laterite is baked for the preparation of Material A, a material having a higher catalytic activity than Material A can be obtained by giving the laterite a suitable chemical treatment prior to the baking. A possible explanation for this improvement is that the chemical treatment given to laterite dissolves out or separates some components of laterite and accordingly decreases the weight of laterite, so that the remaining part of the laterite acquires an enhanced catalytic activity. In the present invention, therefore, a material (hereinafter referred to as Material B) obtained by immersing laterite in the aqueous solution of a compound selected from the group consisting of ammonia and ammonium salts and subsequently baking the resultant treated laterite at a temperature of from 200° C to 500° C can be used as the aforementioned catalyst. Examples of the ammonium salts usable for this purpose are ammonium carbonate and ammonium bromide. Further, in the present invention, a material (hereinafter referred to as Material C) obtained by contacting laterite with hydrogen or ammonia and subsequently baking the resultant treated laterite at a temperature of from 200° C to 500° C can be used as the catalyst.

Material A, Material B and Material C invariably exhibit their catalytic activities to the highest extent when the denitrification temperature is in the neighborhood of 300° C. In contrast, where there is used a material which is obtained by mixing laterite with a specific proportion of a specific metal compound and baking the resultant mixture at a temperature of from 200° C to 500° C, the denitrification temperature at which the highest catalytic activity is exhibited shifts to the lower temperature side (toward 200° C) or to the higher temperature side (toward 400° C). To be more specific, a material (hereinafter referred to as Material D) obtained by adding to laterite 0.1 to 20 percent, preferably 1 to 10 percent, by weight of the oxide or hydroxide of a metal such as manganese, cobalt, aluminum or copper and baking the resultant mixture at a temperature of from 200° C to 500° C exhibits its highest catalytic activity on the lower temperature side. For example, a material obtained by mixing laterite with 10 percent by weight of manganese dioxide and baking the resultant mixture at a temperature in the neighborhood of 300° C exhibits its highest catalytic activity in the neighborhood of 200° C. Examples of the aforementioned oxides of metals include manganese dioxide, aluminum oxide and copper oxide. An example of the aforementioned hydroxides is cobalt hydroxide. On the other hand, a material (hereinafter referred to as Material E) obtained by mixing laterite with 0.1 to 20 percent, preferably 1 to 10 percent, by weight of copper sulfate and baking the resultant mixture at a temperature of from 200° C to 500° C exhibits notably increased catalytic activity at denitrification temperatures of not less than 400° C. In the present invention, therefore, Material D or Material E can also be used as the catalyst. Material E is preferably used at denitrification temperatures of not less than 400° C. By suitably selecting two or more metal compounds from the specified group and using them in the preparation of Material D or Material E, it becomes possible to produce a material capable of exhibiting its highest catalytic activity at a optional denitrification temperature selected within the range of from 200° C to 400° C.

The specific substance used as the catalyst in the present invention is selected suitably from the group consisting of Material A, Material B, Material C, Material D and Material E described above. It should be noted, however that these materials will vary in their respective catalytic activities according to the particular kind of laterite used as the raw material. In this connection, we made a study to ascertain the cause of the variation in the catalytic activity and have consequently learned that traces of Ni, Co, Na and K which are contained originally in laterite have an effect on the catalytic activity. We, therefore, studied these materials with respect to their metal content and have ascertained that the materials exhibit most outstanding catalytic activity when their individual metal contents are such as to satisfy the expression:

$Ni + Cr \geq 0.5$ percent by weight $> Na + K$

For the purpose of this invention, therefore, the materials are particularly preferred to respectively contain nickel, chromium, sodium and potassium at proportions such as to satisfy the formula given above.

When raw materials are baked as described above in the preparation of Material A, Material B, Material C, Material D or Material E, the baking is preferred to be carried out under conditions such that the materials obtained by baking contain respectively at least 1 percent, preferably 4 to 8 percent by weight of the volatile components released from the raw materials when the raw materials are baked at the temperature of 500° C. By this reason, the temperature at which the raw materials are baked is preferred to be in the range of from 200° C to 450° C.

Similarly to any known catalyst, the catalyst which is obtained as described above and which is used as the catalyst in the present invention may, as occasion demands, be molded in the shape of spheres or cylindrical rods of a suitable size. In the denitrification effected by use of the catalyst described above, the ratio of $NO_x$ removal is low where the reaction system is totally devoid of oxygen and is improved where the oxygen content in the reaction system exceeds 1 percent by volume. The ratio of $NO_x$ removal is notably when the oxygen content is greater than 3 percent by volume. This means probably that this catalyst functions as a redox type catalyst in the reaction of $NO_x$ with ammonia and that, therefore, the presence of oxygen in the reaction system does not result in any degradation of the catalytic activity of the catalyst. As will become apparent from the preferred embodiments described below, the catalyst is not degraded in its catalytic activity by the presence of steam or sulfur dioxide in the exhaust gas subjected to treatment.

The exhaust gases which can effectively be treated by the present invention can vary extensively in composition. For example, the present invention permits effective treatment to be carried out on exhaust gases containing from 100 to 2000 ppm of $NO_x$. The exhaust gas being treated is preferred to contain therein not less than 1 percent by volume of oxygen and may contain therein other gases such as steam and sulfur dioxide. Suitably the amount of ammonia to be used in the reaction with $NO_x$ falls in the range of from 0.7 to 2.0, preferably from 0.7 to 1.5, in molar $NH_3/NO_x$ ratio. Where the denitrification is effected by use of Material A, Material B or Material C, the amount of ammonia is preferred to be not less than 1 in molar $NH_3/NO_x$ ratio. The space velocity (hereinafter referred to as SV) is preferred to fall in the range of from 500 to 2000 $hr^{-1}$ (under standard conditions).

Now, the present invention will be described more specifically with reference to working examples. These examples are merely for the purpose of illustration and are not limitative of the invention in any way.

EXAMPLE 1

The laterite produced in Acoje, Philippines was finely divided to particles measuring not more than 200 mesh (by the Tyler standard). The laterite powder was pelletized by a wet-type rotary pelletizer. The pellets thus obtained were dried with hot air at 400° C for 15 minutes, to produce catalyst spheres about 8 mm in diameter.

A quartz tube was packed with the catalyst spheres. The tube was kept at an elevated temperature in an electric furnace and a gas of the following composition was continuously passed through the tube at an SV of 5000 $hr^{-1}$ by way of a test for denitrification of exhaust gas with ammonia. At temperatures in the range of from 200° to 350° C, the ratio of denitrification was 80 percent or over.

Composition of feed gas
NO = 500 ppm
$NH_3$ = 500 ppm
$O_2$ = 3% by volume
$H_2O$ = 16% by volume
$N_2$ = Balance
Ratio of denitrification
200° C = 80%

250° C = 92%
300° C = 91%
350° C = 80%

The laterite used in this example contained 48 percent by weight of Fe, 38 percent by weight of $SiO_2$, 8.3 percent by weight of $Al_2O_3$, 1.1 percent by weight of Ni, 2.4 percent by weight of Cr and about 0.1 percent by weight of Co, while the total content of Na and K was 1200 ppm.

While the raw material which had been dried under vacuum at 80° C experienced a weight loss of about 12.5 percent by weight when baked at 500° C, the catalyst spheres dried with hot air at 400° C retained about 4.5 percent by weight of the weight loss.

EXAMPLE 2

Finely divided particles measuring not more than 200 mesh (by the Tyler standard) and obtained from one of the various raw materials indicated in Table 1 under the conditions similarly indicated in the Table were pelletized by following the procedure of Example 1. The same denitrification test was carried out under the same conditions using ammonia as in Example 1, with the temperature fixed at 300° C. The results were as shown in Table 1 below.

Table 1

| Sample | Raw material | Chemical treatment | Ni+Cr (% by weight) | Na+K (ppm) | Ratio of denitrification | Weight loss (% by weight) |
|---|---|---|---|---|---|---|
| A | Laterite (Philippine . Nonoc) | in 3 % aqueous solution of ammonia, 100° C, 3 hours | 5.1 | 1800 | 80 | 2.8 |
| B | Laterite (Philippine . Homonhon) | in 10% ammonium carbonate aqueous solution, 120° C, 2 hours | 3.4 | 2100 | 89 | 5.1 |
| C | Laterite (Philippine . Acoje) | in 10% ammonium bromide aqueous solution, 120° C, 4 hours | 3.5 | 1200 | 96 | 6.5 |
| D | Laterite (Indonesia Acoje) | in hydrogen, 300° C, 30 minutes | 3.5 | 1200 | 90 | 4.0 |

In Table 1 above, Sample C was the same raw material as used in Example 1. Sample C contained 18.2 percent by weight of components which would be lost by baking at 500° C. The chemical treatment resulted in a decrease in weight in Sample C. In the other Samples, there were contained 2 to 8 percent by weight of components subject to loss by baking at 500° C.

EXAMPLE 3

In an aqueous 10 percent ammonium carbonate solution, the laterite produced in Acoje, Philippines was immersed at 120° C for 2 hours. Four aliquots of the resultant treated laterite were subjected to denitrification test by the different procedures indicated below.
(1) First sample was pelletized with a rotary disc type pelletizer using water to produce pellets 5 mm in diameter and then dried at 300° C for 60 minutes.
(2) Second sample was mixed with 5 percent by weight of colloidal alumina, pelletized and dried by the procedure of (1) above.
(3) Third sample was heated at 300° C for 60 minutes, pelletized and dried by the procedure of (1) above.
(4) Fourth sample, which was obtained by the procedure of (1), was left to stand overnight at room temperature.

Four materials obtained by the procedures of (1) to (4) were respectively subjected to a denitrification test by using the same apparatus as used in Example 1 under the following two sets of conditions. Consequently, there were obtained results which could be regarded as substantially identical to each other as shown in Table 2 below.

| Denitrification test | A | B |
|---|---|---|
| Gas composition | SV = 5000 $hr^{-1}$<br>NO = 300 ppm<br>$NH_3$= 300 ppm<br>$O_2$ = 3% by volume<br>$H_2O$= 16% by volume<br>$N_2$ = Balance | 5000 $hr^{-1}$<br>1000 ppm<br>1000 ppm<br>5% by volume<br>16% by volume<br>Balance |

Table 2

| Material | Ratio of denitrification (%) | |
|---|---|---|
|  | A | B |
| (1) | 90 | 92 |
| (2) | 87 | 87 |
| (3) | 89 | 91 |
| (4) | 88 | 89 |

(Note):
Only in the test of Material (4), the measurement was started 30 minutes after the feeding of gas was begun.

EXAMPLE 4

The same sample and the exhaust gas of the same components as used in Example 1 were subjected to denitrification test at a fixed temperature of 300° C. When the ammonia content alone was decreased from 500 ppm against 500 ppm of NO content, it was ascertained that the efficiency of $NO_x$ removal decreased in proportion as the $NH_3$ content decreased from the equivalent molar amount. When the oxygen content alone was decreased from 3 volume percent against the equivalent mol of ammonia, it was confirmed that the ratio of $NO_x$ removal decreased when the oxygen content was below 1 percent by volume. When the water content alone was varied from 16 volume percent, it was found that the ratio of $NO_x$ removal was not affected while the water content was within the range of from 0 to 30 percent by volume. When the $SO_2$ content alone was varied within the range of from 10 to 1500 ppm, only a slight effect, ascribable to the range of error was recognized.

Subsequently, the exhaust gas having the same components as used in Example 1 (including 200 ppm of $SO_2$) was subjected to continuous denitrification test in the device of Example 1 packed with the catalyst described above, at 300° C for three different periods of 100, 500 and 1000 hours. The results obtained were as shown in Table 3 below.

Table 3

|  | 100 hours | 500 hours | 1000 hours |
|---|---|---|---|
| Ratio of denitrification | 93% | 91% | 92% |

EXAMPLE 5

Figure 1:
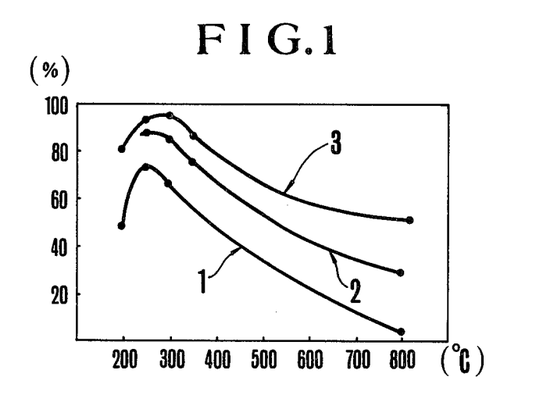
FIG. 1 is a graph showing the relationship between the baking temperature (° C) of laterite and the ratio of denitrification (%), when $NO_x$ was removed from an $NO_x$-containing exhaust gas by the method of this invention using, as the catalyst, materials obtained by baking laterite at various temperatures.

The laterite produced in Acoje, Philippines was mixed with a small proportion of water, molded in the shape of spheres 3 to 5 mm in diameter, then dried and baked at various temperatures. With each resultant material used as catalyst, a nitrogen gas containing 500 ppm of nitrogen monoxide, 3 percent by volume of oxygen and 10 percent by volume of steam was introduced in conjunction with 500 ppm of ammonia at a space velocity of 5000 hr$^{-1}$ (under standard conditions) into a reaction tube at denitrification temperatures of from 200° C to 400° C for removal of NO. The ratios of denitrification were as shown in FIG. 1. In the graph of FIG. 1, 1 denotes the results obtained at a denitrification temperature of 200° C, 2 those obtained at a denitrification temperature of 250° C and 3 those obtained at a denitrification temperature of 300° C. In the graph, the vertical axis is graduated for ratio of denitrification (percent) and the horizontal axis for baking temperature (° C) of laterite.

EXAMPLE 6

Figure 2:
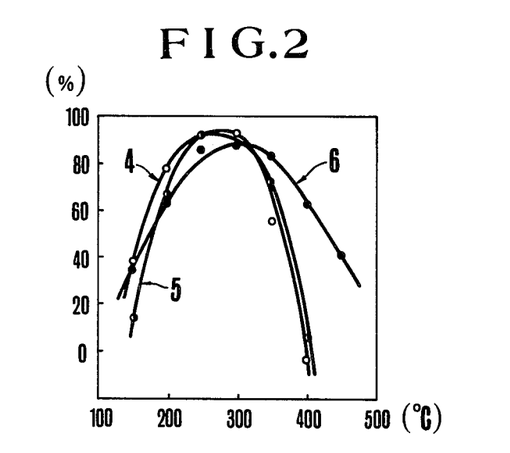
FIG. 2 is a graph showing the relationship between the denitrification temperature (° C) (the temperature at which $NO_x$ and ammonia react) and the ratio of denitrification (%), which were determined when exhaust gases containing $SO_2$ at various concentrations were treated by the method of this invention.

A catalyst was prepared by baking the same laterite as used in Example 5 at a temperature of 300° C. A nitrogen gas containing 500 ppm of nitrogen monoxide, 3 percent by volume of oxygen and 10 percent by volume of steam was introduced in conjunction with 500 ppm of ammonia into a reaction tube to effect the removal of NO from the nitrogen gas in the presence of the catalyst at a space velocity of 10000 hr$^{-1}$ (under standard conditions) and denitrification temperatures of from 200° to 450° C. Another nitrogen gas containing 500 ppm of nitrogen monoxide, 3 percent by volume of oxygen, 10 percent by volume of steam and 30 ppm of sulfur dioxide was subjected to the same treatment as described above. Still another nitrogen gas containing 500 ppm of nitrogen monoxide, 3 percent by volume of oxygen, 10 percent by volume of steam and 150 ppm of sulfur dioxide was also subjected to the same treatment. The ratios of removal of NO in these treatments were as shown in FIG. 2. As is evident from FIG. 2, the catalyst was not poisoned by the sulfur dioxide present in the feed gas. In the graph of FIG. 2, 4 denotes the results obtained in the treatment of the nitrogen gas containing no sulfur dioxide, 5 those obtained in the treatment of the nitrogen gas containing 30 ppm of sulfur dioxide and 6 those obtained in the treatment of the nitrogen gas containing 150 ppm of sulfur dioxide, respectively. In the graph, the vertical axis is graduated for ratio of denitrification (%) and the horizontal axis for denitrification temperature (° C).

EXAMPLE 7

Figure 3:
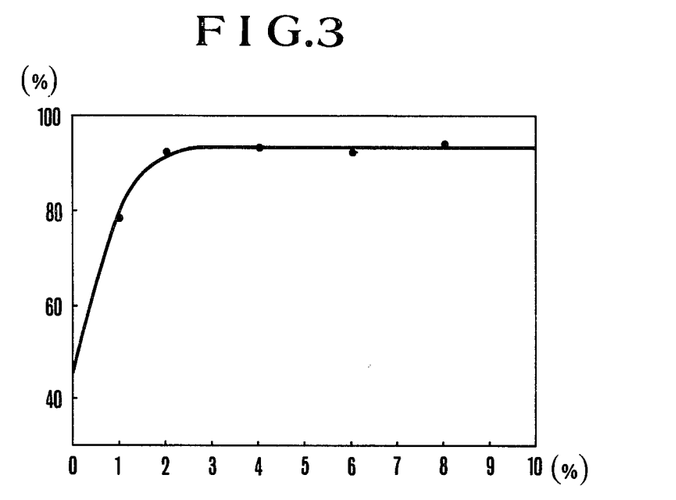
FIG. 3 is a graph showing the relationship between the oxygen concentration (% by volume) in exhaust gases and the ratio of denitrification (%), which were determined when the exhaust gases were treated by the method of this invention.

The same laterite as used in Example 5 was baked at 280° C to produce a catalyst. A nitrogen gas containing 500 ppm of nitrogen monoxide, 10 percent by volume of water and various concentrations of oxygen was introduced in conjunction with 500 ppm of ammonia into a reaction tube to effect the removal of NO from the nitrogen gas in the presence of the catalyst at a space velocity of 5000 hr$^{-1}$ and a denitrification temperature of 300° C. The results were as shown in FIG. 3. The results indicated that the effect of NO removal was increased by the presence of oxygen. In the graph of FIG. 3, the vertical axis is graduated for ratio of denitrification (%) and the horizontal axis for concentration of oxygen (% by volume).

EXAMPLE 8

Figure 4:
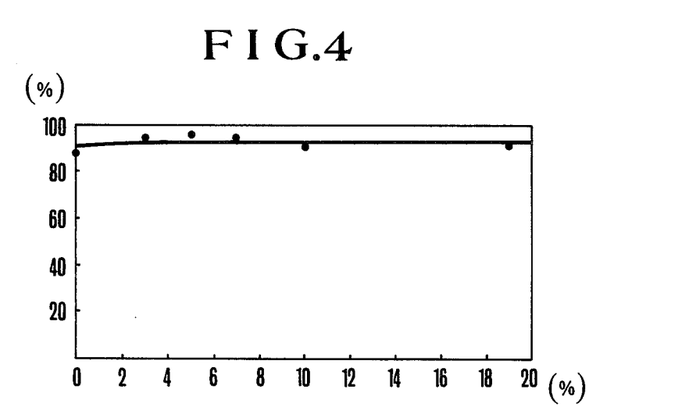
FIG. 4 is a graph showing the relationship between the $H_2O$ concentration (% by volume) in exhaust gases containing $H_2O$ at various concentrations and the ratio of denitrification (%), which were determined when the exhaust gases were treated by the method of this invention.

The same laterite as used in Example 5 was baked at 320° C to produce a catalyst. A nitrogen gas containing 500 ppm of nitrogen monoxide, 3 percent by volume of oxygen and various concentrations of water was introduced in conjunction with 500 ppm of ammonia into a reaction tube to effect the denitrification at a space velocity of 5000 hr$^{-1}$ and a denitrification temperature of 300° C. The results were as shown in FIG. 4. The results indicated that the water present in the nitrogen gas had no effect upon the ratio of NO removal. In the graph of FIG. 4, the vertical axis is graduated for ratio of denitrification (%) and the horizontal axis for concentration of water (% by volume).

EXAMPLE 9

Figure 5:
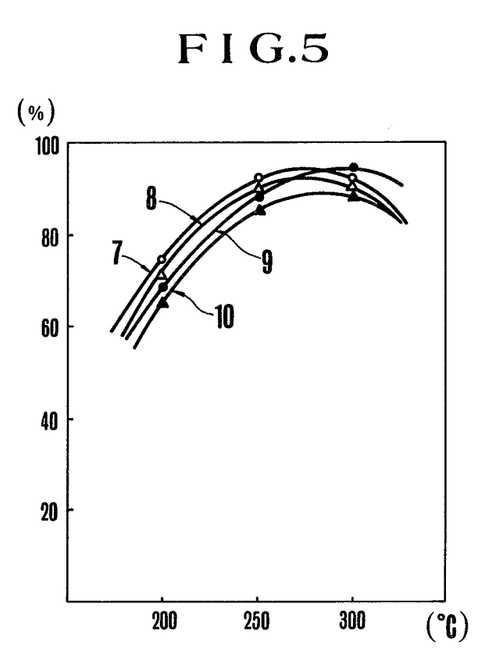
FIG. 5 is a graph showing the relationship between the denitrification temperature (° C) and the ratio of denitrification (%), which were determined when exhaust gases containing NO at various concentrations were treated by the method of this invention.

The same laterite as used in Example 5 was baked at 300° C to produce a catalyst. A nitrogen gas containing 3 percent by volume of oxygen, 10 percent by volume of water and various concentrations of nitrogen monoxide was introduced in conjunction with the molar equivalent of ammonia to the nitrogen monoxide into a reaction tube to effect the denitrification at a space velocity of 5000 hr$^{-1}$ and denitrification temperatures of 200° C to 350° C. The results were as shown in FIG. 5. The denitrification of the nitrogen gas was effected at high ratios independent of the NO concentration in the nitrogen gas.

In the graph of FIG. 5, 7 denotes the results obtained when the nitrogen gas containing 300 ppm of NO, 8 those obtained when the nitrogen gas containing 500 ppm of NO, 9 those obtained when the nitrogen gas containing 700 ppm of NO and 10 those obtained when the nitrogen gas containing 1000 ppm of NO, respectively. In the graph of FIG. 5, the vertical axis is graduated for ratio of denitrification (%) and the horizontal axis for denitrification temperature (° C).

EXAMPLE 10

Figure 6:
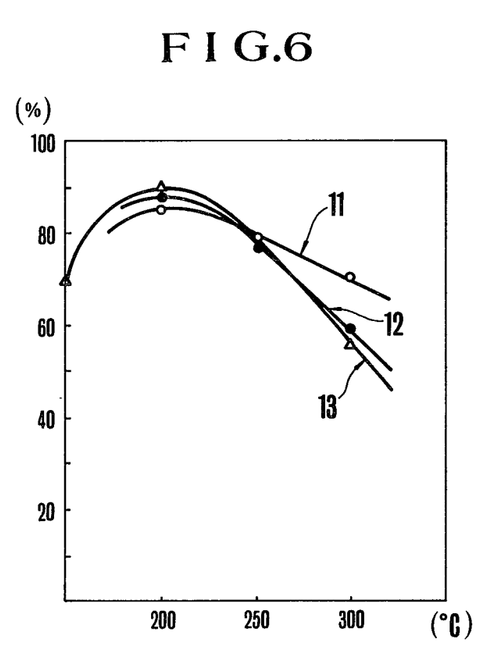
FIG. 6 is a graph showing the relationship between the denitrification temperature (° C) and the ratio of denitrification (%), which were determined when an exhaust gas was treated by the method of this invention using, as the catalyst, materials obtained by baking, at a fixed temperature of 300° C, mixtures of laterite and manganese dioxide in various proportions.

The same laterite as used in Example 5 was mixed with various proportions of manganese dioxide ($MnO_2$) and the resultant mixture was baked at 300° C to produce a catalyst. A nitrogen gas containing 500 ppm of nitrogen monoxide, 3 percent by volume of oxygen and 10 percent by volume of water was introduced in conjunction with 500 ppm of ammonia into a reaction tube in the presence of the catalyst to effect the removal of NO from the nitrogen gas at a space velocity of 5000 hr$^{-1}$ and denitrification temperatures of 200° C to 350° C. The results were as shown in FIG. 6. In the graph of FIG. 6, 11 denotes the results obtained by using as the catalyst the material prepared by baking at 300° C a mixture of laterite with 2 percent by weight of manganese dioxide, 12 those obtained by using as the catalyst the material prepared by baking at 300° C a mixture of laterite with 5 percent by weight of manganese dioxide and 13 those obtained by using as the catalyst the material prepared by baking at 300° C a mixture of laterite with 10 percent by weight of manganese dioxide, respectively. In the graph of FIG. 6, the vertical axis is graduated for ratio of denitrification (%) and the horizontal axis for denitrification temperature (° C).

EXAMPLE 11

Figure 7:
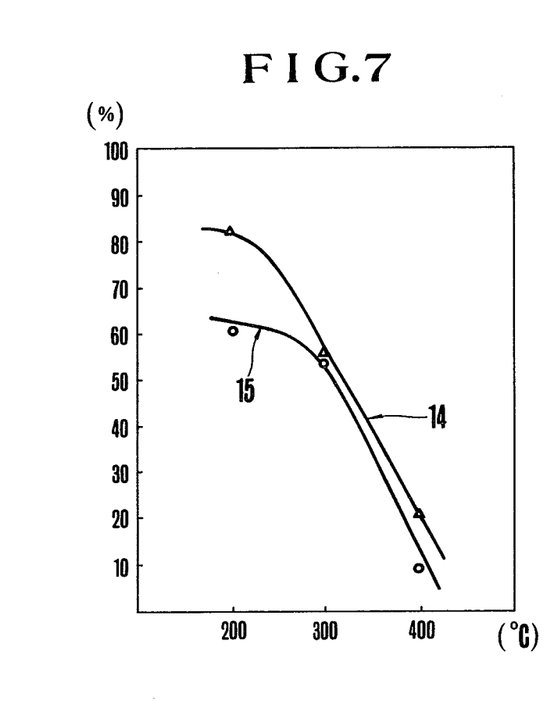
FIG. 7 is a graph showing the relationship between the denitrification temperature (° C) and the ratio of denitrification (%), which were determined when an exhaust gas was treated by the method of this invention using, as the catalyst, materials obtained by baking, at a fixed temperature of 300° C, laterite and aluminum oxide mixed in various proportions.

The same laterite as used in Example 5 was mixed with various proportions of aluminum oxide ($Al_2O_3$) and the resultant mixtures were baked at 300° C to produce catalysts. By using the catalysts thus prepared, the same test as performed in Example 10 was carried out. The results were as shown in FIG. 7. In the graph of FIG. 7, 14 denotes the results obtained by using as the catalyst a material prepared by baking at 300° C a mixture of laterite with 1 percent by weight of aluminum oxide and 15 those obtained by using as the catalyst a material prepared by baking at 300° C a mixture of laterite with 3 percent by weight of aluminum oxide. In the graph of FIG. 7, the vertical axis is graduated for ratio of denitrification (%) and the horizontal axis for denitrification temperature (° C).

EXAMPLE 12

Figure 8:
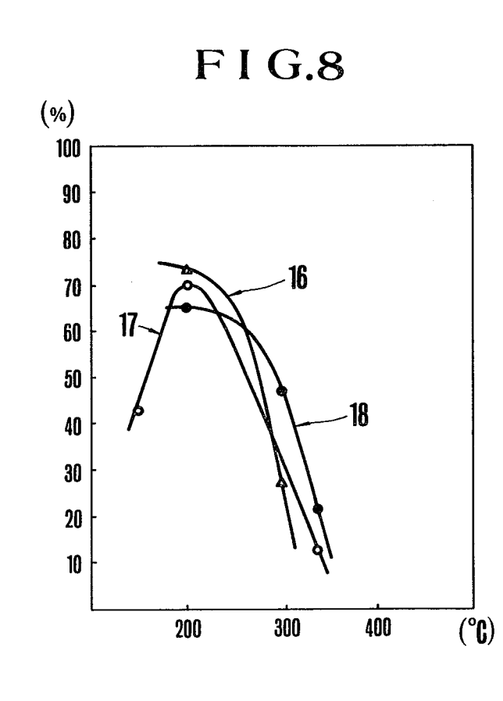
FIG. 8 is a graph showing the relationship between the denitrification temperature (° C) and the ratio of denitrification (%), which were determined when an exhaust gas was treated by the method of this invention using, as the catalyst, materials obtained by baking, at a fixed temperature of 300° C, mixtures of laterite and cobalt hydroxide in various proportions.

The same laterite as used in Example 5 was mixed with various proportions of cobalt hydroxide (Co(OH)$_2$) and the resultant mixtures were baked at 300° C to produce catalysts. By using the catalysts thus prepared, the same test as in Example 10 was carried out. The results were as shown in FIG. 8. In the graph of FIG. 8, 16 denotes the results obtained by using as the catalyst a material prepared by baking at 300° C a mixture of laterite with 20 percent by weight of cobalt hydroxide, 17 those obtained by using as the catalyst a material prepared by baking at 300° C a mixture of laterite with 5 percent by weight of cobalt hydroxide and 18 those obtained by using as the catalyst a material prepared by baking at 300° C a mixture of laterite with 10 percent by weight of cobalt hydroxide, respectively. In the graph of FIG. 8, the vertical axis is graduated for ratio of denitrification (%) and the horizontal axis for denitrification temperature (° C).

EXAMPLE 13

Figure 9:
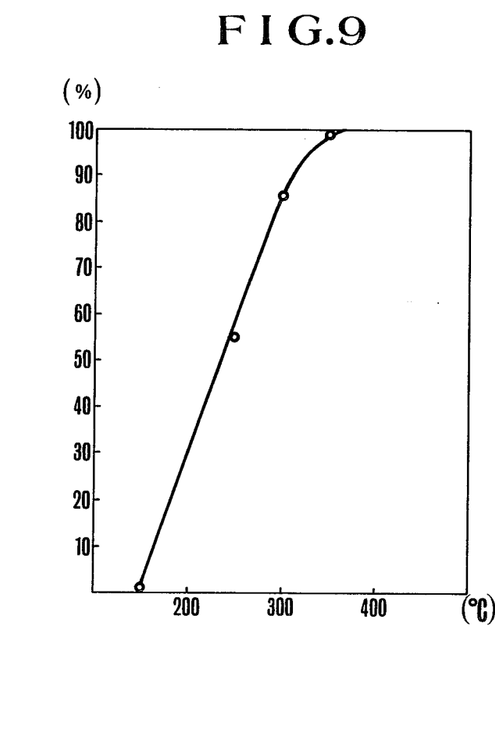
FIG. 9 is a graph showing the relationship between the denitrification temperature (° C) and the ratio of denitrification (%), which were determined when an exhaust gas was treated by the method of this invention using, as the catalyst, a material obtained by baking at 300° C a mixture having copper oxide added at 5% by weight to the laterite.

The same laterite as used in Example 5 was mixed with 5 percent by weight of copper oxide (CuO) and the resultant mixture was baked at 300° C to produce a catalyst. By using this catalyst, the same test as described in Example 10 was carried out. The results were as shown in FIG. 9. In the graph of FIG. 9, the vertical axis is graduated for ratio of denitrification (%) and the horizontal axis for denitrification temperature (° C).

EXAMPLE 14

Figure 10:
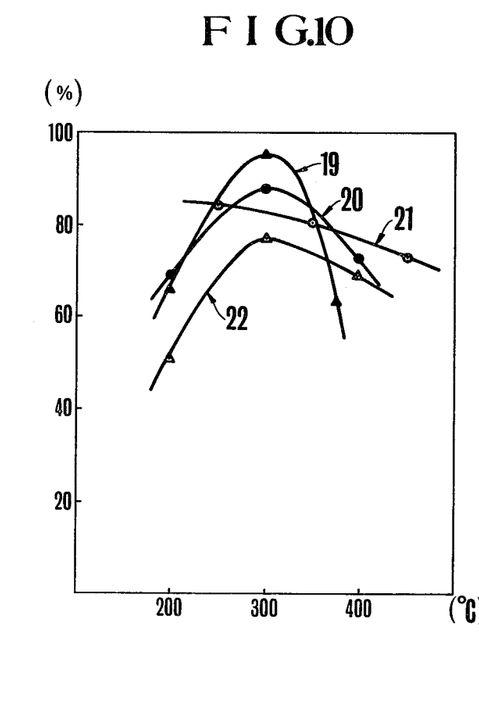
FIG. 10 is a graph showing the relationship between the denitrification temperature (° C) and the ratio of denitrification (%), which were determined when an exhaust gas was treated by the method of this invention using, as the catalyst, materials obtained by baking, at a fixed temperature of 300° C, four kinds of laterite originating in different places.

Four kinds of laterite produced in different places (Acoje of Phillipines, Pomala of New Caledonia, Porony of Celebes and Oeyama of Japan) were each baked at 300° C to produce catalysts. By using these catalysts, the removal of NO was carried out under the same conditions as those of Example 5. The results were as shown in FIG. 10. In the graph of FIG. 10, 19 denotes the results obtained by using the catalyst from the laterite of Acoje (Philippines), 20 those obtained by using the catalyst from the laterite of Pomala (New Caledonia), 21 those obtained by using the catalyst from the laterite of Porony (Celebes) and 22 those obtained by using the catalyst from the laterite of Oeyama (Japan), respectively. In the graph of FIG. 10, the vertical axis is graduated for ratio of denitrification (%) and the horizontal axis for denitrification temperature (° C).

EXAMPLE 15

Figure 11:
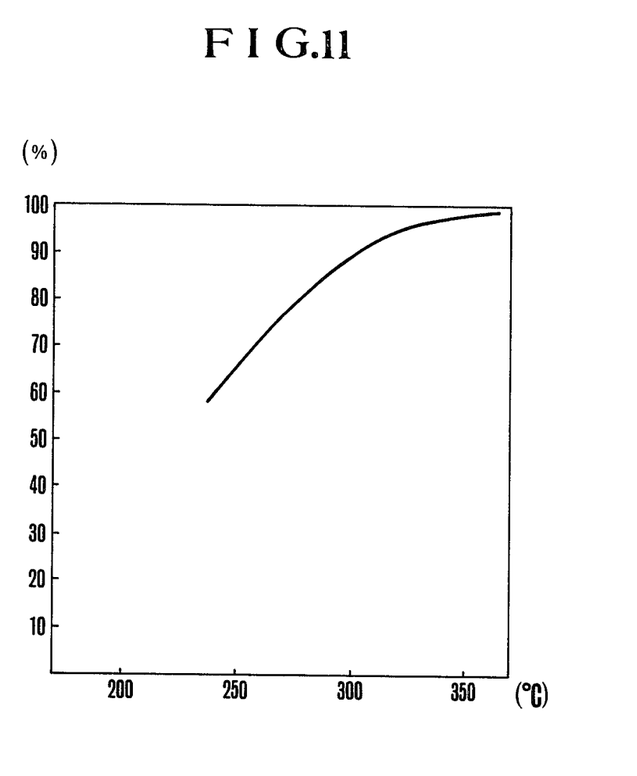
FIG. 11 is a graph showing the relationship between the denitrification temperature (° C) and the ratio of denitrification (%), which were determined when an exhaust gas was treated by the method of this invention using, as the catalyst, a material obtained by baking at 300° C a mixture of laterite and 2% by weight copper sulfate.

The same laterite as used in Example 5 was mixed with 2 percent by weight of copper sulfate (CuSO$_4$) and the resultant mixture was baked at 300° C to produce a catalyst. A nitrogen gas containing 500 ppm of nitrogen monoxide, 3 percent by volume of oxygen and 10 percent by volume of water was introduced in conjunction with 500 ppm of ammonia in the presence of the catalyst to effect the removal of NO from the nitrogen gas at a space velocity of 5000 hr$^{-1}$ at reaction temperatures of 240° C to 360° C. The results were as shown in FIG. 11. In the graph of FIG. 11, the vertical axis is graduated for ratio of denitrification (%) and the horizontal axis for denitrification temperature (° C).

What is claimed is:

1. In a method for removing nitrogen oxides from an exhaust gas by contacting the exhaust gas with ammonia, the improvement comprising:
    contacting said exhaust gas with ammonia in the presence of a catalyst obtained by baking laterite in admixture with 0.1 to 20 percent by weight of at least one oxide or hydroxide of a metal selected from the group consisting of manganese, cobalt and aluminum, at a temperature of from 200° C to 500° C.

2. The method according to claim 1, wherein said catalyst contains nickel, chromium, sodium and potassium in amounts satisfying the formula:

Ni + Cr ≧ 0.5 percent by weight > Na + K.

3. The method of claim 1 wherein the exhaust gas is contacted with ammonia and the catalyst at a temperature in the neighborhood of 200° C.

* * * * *